A. M. JOHNSON.
HOG HOLDER.
APPLICATION FILED NOV. 19, 1920.
1,372,952.
Patented Mar. 29, 1921.
2 SHEETS—SHEET 1.
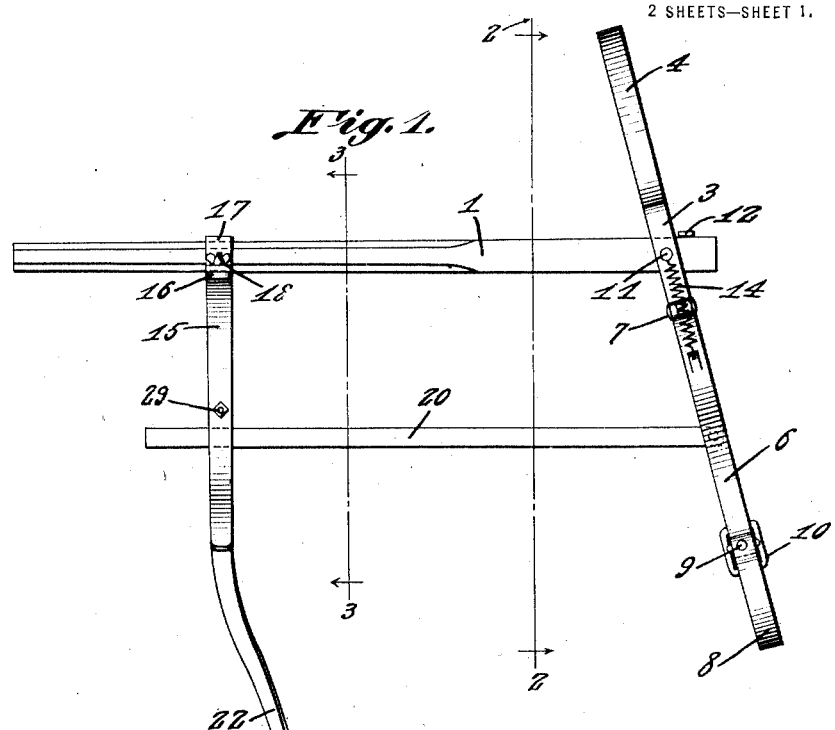
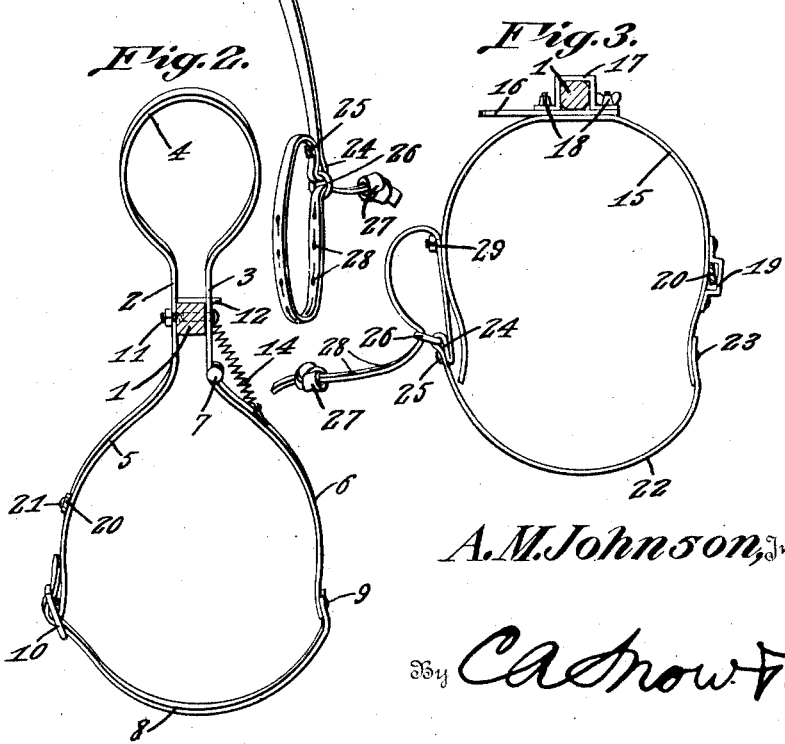
A. M. Johnson, Inventor
By C. A. Snow & Co.
Attorney

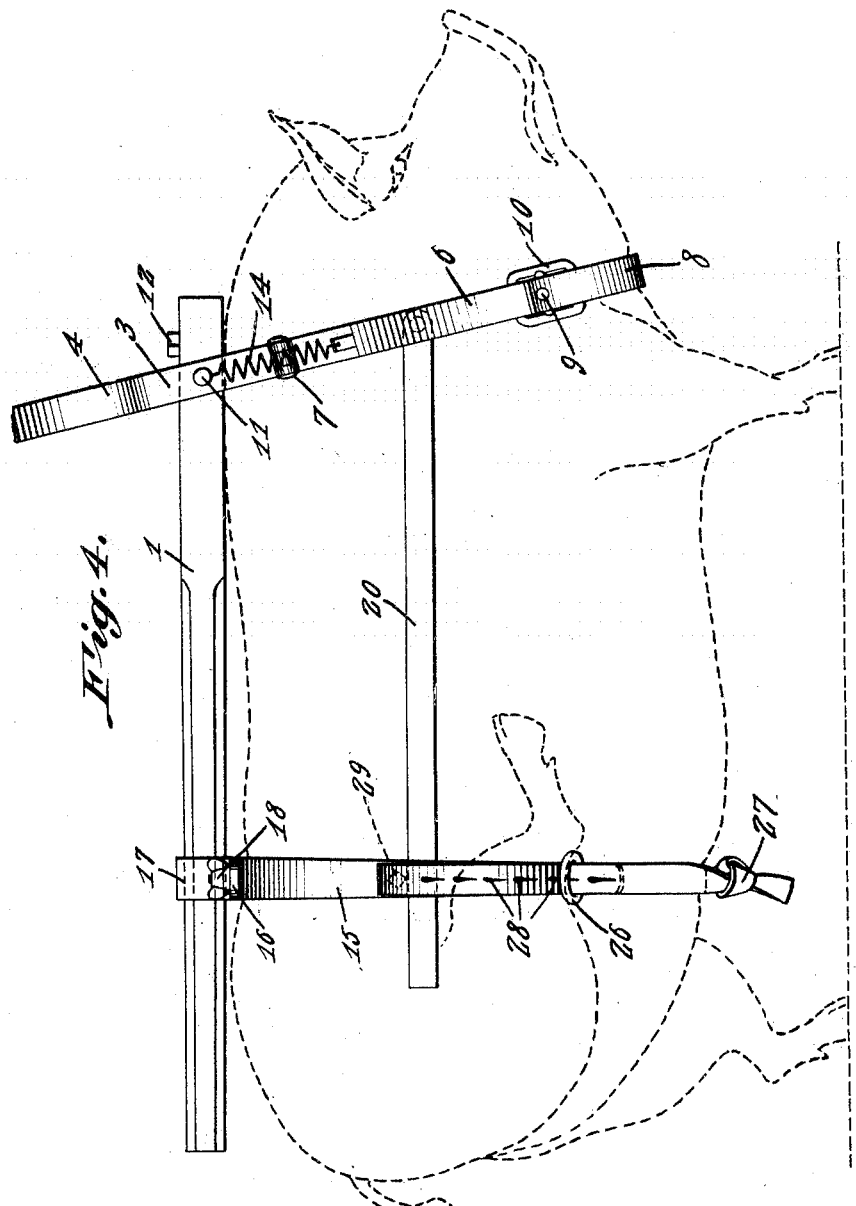

UNITED STATES PATENT OFFICE.

ARLEY M. JOHNSON, OF BELLE CENTER, OHIO.

HOG-HOLDER.

1,372,952.     Specification of Letters Patent.     Patented Mar. 29, 1921.

Application filed November 19, 1920. Serial No. 425,205.

*To all whom it may concern:*

Be it know that I, ARLEY M. JOHNSON, a citizen of the United States, residing at Belle Center, in the county of Logan and State of Ohio, have invented a new and useful Hog-Holder, of which the following is a specification.

It is the object of this invention to provide a simple means for holding a hog, portions of the body of the hog being permitted to have the necessary relative movement, and restraint being exerted in those directions in which restraint is necessary or desirable.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention; Fig. 2 is a cross section on the line 2—2 of Fig. 1; Fig. 3 is a cross section on the line 3—3 of Fig. 1, and Fig. 4 is a side elevation showing the device applied to a hog.

The device forming the subject matter of this application includes a main bar 1. A forward body encircling member is provided, the same being a composite structure. The forward body encircling member includes a strip of metal fashioned into parallel parts 2 and 3, connected by a loop-shaped handle 4, the part 2 merging into an arm 5, an arm 6 being hinged to the part 3 as indicated at 7. A flexible element 8 is connected at 9 to the arm 6. There is a buckle 10 on the arm 5, wherewith the flexible element 8 may be engaged. A spring 14 extends between the arm 6 and the bar 1 and tends to open the arm 6 when the strip or flexible element 8 is released from the buckle 10. The parts 2 and 3 lie on opposite sides of the main bar 1 and are connected thereto by a pivot element 11, the handle 4 being disposed above the bar. It will be understood that the strip out of which the parts 5, 2, 3 and 4 are made is rigid, the arm 6 being rigid, and the element 8 being flexible. The forward body encircling member is connected by the pivot element 11 to the bar 1 in such a way that the said member can swing forwardly and rearwardly, the forward swinging movement of the said member being limited by a stop 12 mounted on the bar 1.

The device includes a rear body encircling member including a yoke 15 which preferably is rigid, a plate 16 being superposed on the yoke, and a clamp 17 being superposed on the plate, the clamp receiving the bar 1 and being held thereto by bolts and wing nuts 18, the bolt and wing nut structures passing through the ends of the clamp 17 and through the plate 16, the bolts being connected to the yoke 15. The plate 16 projects laterally beyond the bar 1, as shown in Fig. 3, and may be used as a handle. One side portion of the yoke 15 is supplied with a guide 19 wherein a rigid connection 20 is mounted to reciprocate, the forward end of the connection being pivoted at 21 to one arm 5 of the forward body encircling member. One end of a flexible element 22 is connected at 23 to one side portion of the yoke 15. The flexible element 22 is folded on itself, and secured as indicated at 25, to fashion an eye 24. A ring 26 is mounted in the eye 24. The flexible element 22 has an enlargement 27 which prevents the free end of the flexible element from being withdrawn from the ring 26. The flexible element 22 is provided with openings 28, any one of which may be mounted on a stud or retainer 29 carried by one side portion of the yoke 15.

In practical operation, the arm 6 is swung to an open position by the action of the spring 14, the flexible element 8 being engaged around the body of the animal, the arm 6 being swung downwardly, and the flexible element 8 being engaged with the buckle 10. The flexible element 22 is engaged around the body of the animal, one of the openings 28 being engaged with the part 29. One leg of the animal may be passed through the loop which exists between the retainer 29 and the ring 26, a pull being exerted on the free end of the flexible element 22. The construction of the device is such that a hog or other animal may be held securely. At the same time, the forward body encircling member can swing with the pivot element 21 as a fulcrum, the device thus accommodating itself to certain movements of the body of the animal, the rigid connection 20 sliding in the guide 19. The connection 20 serves to restrain the animal against too free movement.

It is to be observed that the pivot element 11 exercises a double function, in that it serves as a mounting for the forward body encircling member, and serves, also, as a place of attachment for the upper end of the spring 14. The wing nuts 18 may be slacked away, the clamp 17 being shifted longitudinally of the bar 1, toward and away from the forward end of the bar, thereby to adjust a space between the body encircling members and to make the device operative and useful, in connection with animals of different sizes.

Having thus described the invention, what is claimed is:—

1. In a device of the class described, a main bar; a forward body encircling member pivoted to the bar and comprising a handle extended above the bar; a rear body encircling member fixed to the bar; and a rigid connection pivoted to the forward body encircling member and held for reciprocation on the rear body encircling member.

2. In a device of the class described, a main bar; a forward body encircling member pivoted to the bar; a rear body encircling member fixed to the bar; and a rigid connection pivoted to the forward body encircling member and held for reciprocation on the rear body encircling member.

3. In a device of the class described, a main bar; coöperating elements comprising a forward body encircling member and a rear body encircling member, one of said coöperating elements being pivoted to the bar, and the other of said coöperating elements being fixed to the main bar; and a rigid connection pivoted to one of said coöperating elements and mounted slidably on the other of said coöperating elements.

4. In a device of the class described, a main bar; a forward body encircling member pivoted to the main bar; a yoke fixed to the main bar; a connection pivoted to the forward body encircling element and mounted slidably on the yoke; and a flexible element connected to the yoke, the flexible element being provided with means for receiving the end of the flexible element slidably, thereby to fashion a leg-encircling loop.

In testimony that I claim the foregoing as my own, I have hereto affixed my signature in the presence of two witnesses.

ARLEY M. JOHNSON.

Witnesses:
 CARL L. POMEROY,
 WM. J. HAGERMAN.